United States Patent [19]

Yonezawa

[11] Patent Number: 4,524,660

[45] Date of Patent: Jun. 25, 1985

[54] PNEUMATIC-HYDRAULIC DRIVING DEVICE FOR THE KNOCKOUT MECHANISM ASSOCIATED WITH THE SLIDE OF A PRESS-MACHINE

[75] Inventor: Keitaro Yonezawa, Itamishi, Japan

[73] Assignee: Aioi Seiki Kabushiki Kaisha, Hyogoken, Japan

[21] Appl. No.: 531,573

[22] Filed: Sep. 12, 1983

Related U.S. Application Data

[63] Continuation of Ser. No. 266,787, May 26, 1981, abandoned.

[30] Foreign Application Priority Data

Jun. 2, 1980 [JP] Japan ........................... 55-77094[U]

[51] Int. Cl.³ .......................... B26D 5/12; B60T 7/02

[52] U.S. Cl. ........................................ 83/639; 60/545; 60/547.1; 60/591; 60/593; 60/594

[58] Field of Search ................ 60/591, 593, 537, 565, 60/594, 545, 547.1; 100/269 R; 83/639

[56] References Cited

U.S. PATENT DOCUMENTS

| | | | |
|---|---|---|---|
| 4,147,179 | 4/1979 | Miura | 91/443 |
| 4,182,360 | 1/1980 | Neff | 91/443 |
| 4,288,987 | 9/1981 | Grüllmeier | 60/593 |

FOREIGN PATENT DOCUMENTS

| | | | |
|---|---|---|---|
| 532980 | 2/1941 | United Kingdom | 60/591 |

*Primary Examiner*—Abraham Hershkovitz
*Attorney, Agent, or Firm*—Bacon & Thomas

[57] ABSTRACT

An improved pneumatic-hydraulic driving device for the knockout mechanism associated with the slide of a press-machine wherein the device serves to actuate the knockout mechanism in a controlled manner to provide cushioning motion during punching of the work, and knocking out motion after punching to permit removal of the punched work by a transfer machine, with the device being particularly useful in the fabrication of printed circuit plates wherein the device serves to decrease cycle-time of fabrication and increase quantity of production.

10 Claims, 4 Drawing Figures

PNEUMATIC-HYDRAULIC DRIVING DEVICE FOR THE KNOCKOUT MECHANISM ASSOCIATED WITH THE SLIDE OF A PRESS-MACHINE

This application is a division of application Ser. No. 266,787 filed May 26, 1981 now abandoned.

BACKGROUND OF THE INVENTION

1. Field of the Invention

The present invention relates to the field of technology involving pneumatic-hydraulic driving devices for the knockout mechanism associated with the slide of a press-machine. More particularly, the invention relates to a system for controlling the cushioning and knockout motions to facilitate removal of punched work by a transfer machine.

2. Description of the Prior Art

In conventional pneumatic-hydraulic driving devices, the hydraulic output chamber is constructed to communicate with the knockout cylinder at all times during punching of the work under cushioning. However, this arrangement produces problems which prior art technology has been unable to solve.

Because the piston of the knockout cylinder functions to expand and contract elastically with the hydraulic pressures applied by the device, after the slide of the press-machine crank approaches its bottom dead point, the work is pushed by the pad-frame through the downward force of the knockout cylinder, thus causing the work to be punched under a cushioned condition. Just after punching, when the slide is elevated, the pad-frame continues to push the work, with the latter thereby being knocked out by the pad-frame from the upper die onto the lower die. Heretofore, the knocked out work remains on the lower die, thus causing difficulty in transferring the work out of the press-machine by the chute of a transfer machine. This situation requires additional time to remove the work and in turn increases punching cycle-time, a particular disadvantage under mass-production conditions.

SUMMARY OF THE INVENTION

The present invention permits knocking out the work after the work has been elevated to a certain height over the lower die through actuating a charge valve associated with the hydraulic passage in the pneumatic-hydraulic driving device. When the slide is approaching the bottom dead point, the pad-frame is pushing the work on the lower die. During punching of the work by the upper die, the hydraulic pressure can pass through a check valve to the hydraulic output chamber, thus providing adequate cushioning motion. After this cushioning motion, because of the checking function of the check valve, the hydraulic pressure cannot be charged, therefore maintaining the knockout piston in its contracted condition to prevent knockout motion from being initiated. While maintaining this condition and after the slide has been elevated to a given height, the charge valve is opened and knockout motion is initiated by charging the pressurized oil into the actuating chamber from the hydraulic output chamber. Thus, by knocking out the work from the upper die into a space over the lower die, the work can be easily transferred outside the press-machine by inserting the chute of a transfer machine under the work.

The invention comprises a pneumatic-hydraulic driving device for a knockout mechanism equipped on the slide of a crank press-machine. A pneumatic cylinder chamber and an hydraulic output chamber are formed in series in a casing of the driving device. The pneumatic cylinder chamber is provided with a movable actuating piston and the hydraulic output chamber is provided with a slidable plunger that is operatively connected to the actuating piston for joint movement. An outlet return port is in communication with an outlet port formed in the casing in order to connect the hydraulic passage communicating with the knockout device. The hydraulic passage is provided with a check valve and a charge valve. The charge valve is set to open only when the plunger is pressurizing the oil which is in turn charged into the actuating chamber of the knockout cylinder. The check valve serves to check flow of the pressurized oil into the knockout cylinder. During cushioning, the oil in the actuating chamber is permitted to pass through the check valve into the hydraulic output chamber. After cushioning and through actuation of the check valve, the flow of oil into the actuating chamber is checked completely, thus placing the knockout piston in its contracted condition. After the slide has been elevated to a given height under this contracted condition, the pressurized oil is charged into the actuating chamber from the output return port by opening the charge valve, thus initiating the knockout motion. Through this latter motion, the punched work is knocked out into a chute arranged under the work and removed from the press-machine.

Through the invention, it is now possible to significantly shorten the time needed for removing the punched work, thus shortening cycle-time and increasing quantity of fabrication. Moreover, the benefit can be obtained easily and economically by only requiring inserting the chute of the transferring machine between the upper and lower dies. Further, when compared with the prior art devices, the invention can be easily and economically adopted by existing industry, requiring only the incorporation of a charge valve and a check valve of simple construction into known machines with only minor changes.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof.

DETAILED DESCRIPTION OF THE PREFERRED EMBODIMENTS

Figure 1:
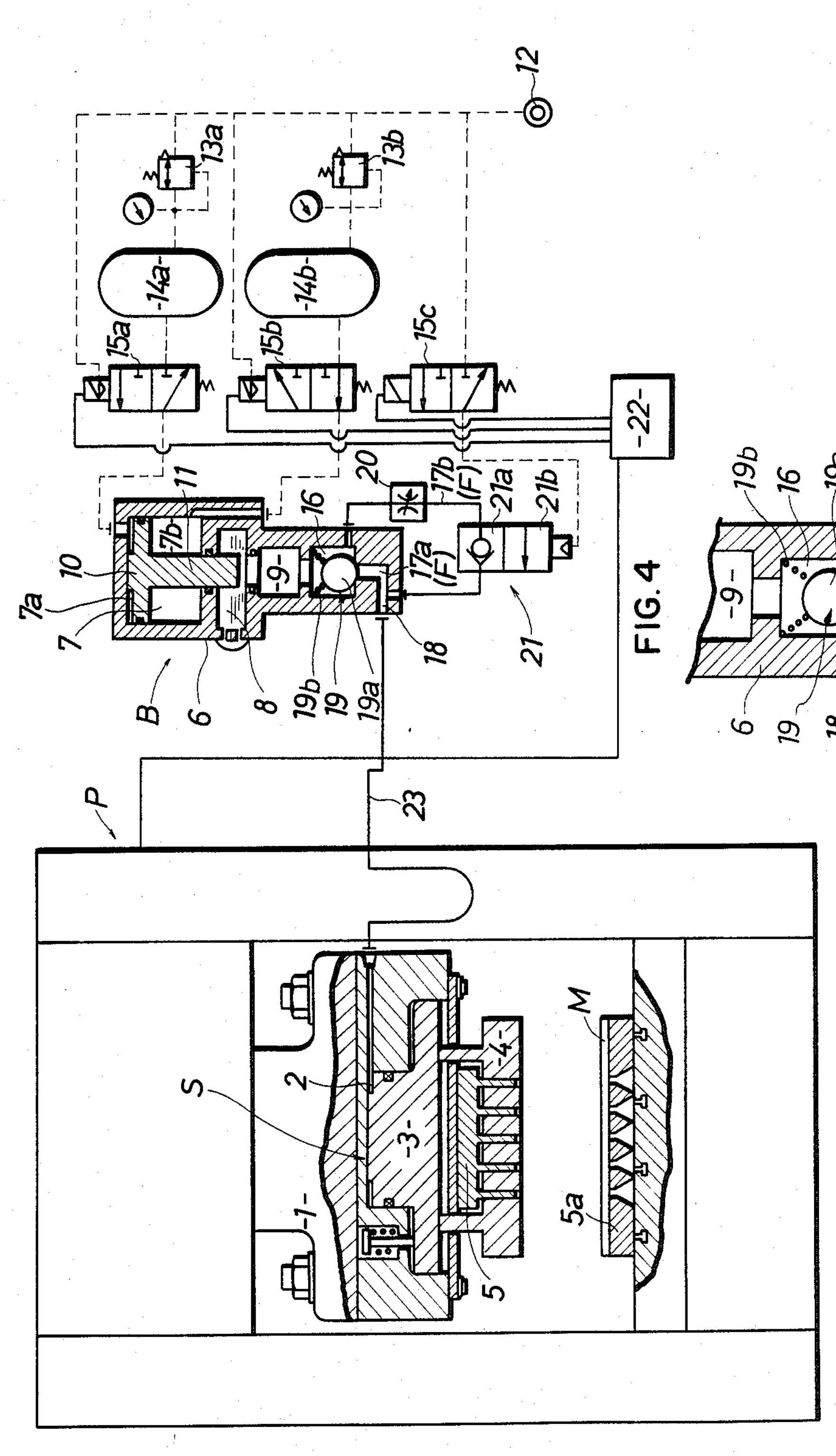
FIG. 1 is an elevational view partially in section of a press-machine and a pneumatic-hydraulic driving device according to an embodiment of the present invention.

Referring to FIG. 1, the knockout device (S) is attached on the slide (1) of the crank-press machine (P), and the pressurized oil is charged into the actuating chamber (2) of the knockout device (S) from a pneumatic-hydraulic driving device (B).

Thus, when punching the printed electric circuit plate (M) on the lower die (5*a*), said plate is held down with a pad-frame (4) by lowering the knockout piston (3), the printed electric circuit plate (M) is punched while being cushioned by the upper punching die (5) by lowering the slide (1). During cushioning, the knockout piston (3) is elevated up to its upper position.

Just after punching, as the slide (1) is lifted by the crank mechanism of the press, the knockout piston (3) again advances down quickly with the hydraulic pressure in the actuating chamber (2), and the printed circuit plate (M) is knocked out by the pad-frame (4) which is pushed with the knockout piston (3).

In order to rapidly remove the work (M) from the press machine (P), it is preferable to delay the knockout motion for a short period of time immdiately after punching, a procedure that is accomplished by the present invention.

Now, with reference to the pneumatic-hydraulic driving device (B), within which casing (6), a pneumatic-cylinder chamber (7) and an oil tank (8) and a hydraulic output chamber (9) are constructed, respectively, in the upper part, the mid part and the lower part.

The pneumatic cylinder chamber (7) is provided with a piston (10), and the hydraulic output chamber (9) is provided with a slidable plunger (11) having its top connected with the piston (10).

The upper part of the pneumatic cylinder chamber (7) above the piston (10) functions as a driving chamber (7*a*), and the lower part of the pneumatic cylinder chamber (7) under the piston (10) functions as a cushion chamber (7*b*).

The driving chamber (7*a*) communicates with the pneumatic source (12) by a pneumatic passage, which is provided with a pressure regulator (13*a*), an accumulator (14*a*) and directional control valve (15*a*) in series from upstream.

Similarly, the cushion chamber (7*b*) communicates with the pneumatic source (12) by a pneumatic passage, which is provided with a pressure regulator (13*b*), an accumulator (14*b*) and a directional control valve (15*b*) in series from upstream.

The set pressure of said regulator (13*a*) is higher than the set pressure of said regulator (13*b*), therefore when charging compressed air both into the driving chamber (7*a*) and the cushion chamber (7*b*), respectively, the piston (10) is actuated downward by the differential pneumatic force. Simultaneously, the plunger (11) is actuated into the hydraulic output chamber (9), with the oil in the hydraulic output chamber (9) being pressurized with oil charged from the oil tank (8).

In the lower part of the casing (6), an output return port (16) is formed so as to communicate with the hydraulic output chamber (9) as a valve chest. Said output return port (16) communicates with the outlet port (18) formed in the outer part of the casing (6) in order to provide communication between the hydraulic passage (23) and the actuating chamber (2). The output return port (16) communicates with the outlet port (18) with a hydraulic passage (F), which comprises a pair of hydraulic passages, a large flow passage (17*a*) and a small flow passage (17*b*).

The output return port (16) is provided with a check valve (19), whose valve body (19*a*) being biased elastically by a coil spring (19*b*) to engage the inlet of said large flow passage (17*a*).

The small flow passage (17*b*) is provided with a variable restrictor (20) and a locking valve (21) in series.

The locking valve (21) is a pneumatically operated directional valve comprising a check valve (21*a*) and a charge valve (21*b*), with operating air being supplied from the pneumatic source (12) through a pneumatic passage provided with a directional control valve (15*c*).

Both directional control valves (15*a*.15*b*) are solenoid-air operated type, and said directional control valve (15*c*) is solenoid operated type. The switching operation of control valves (15*a*.15*b*.15*c*) are executed by electrical operating signals directed from a rotary cam switch (22) of the crank-press (P).

Referring to the knockout device and its driving device, sequential mechanical motion will now be described.

As an example for this embodiment, the set pressure of said regulator (13*a*) is nearly 3.0∼7.0 kg/cm$^2$G, but not limitted to this range of value, and the set pressure of said regulator (13*b*) is nearly 0.1∼0.2 kg/cm$^2$G.

In punching the printed circuit plate (M) by driving the crank-press (P) continuously, when the slide (1) approaches down nearly to its bottom dead point, said rotary cam switch (22) changes said control valve (15*a*) into [ON] in order to supply compressed air to said driving chamber (7*a*), and rotary switch (22) keeps said control valve (15*b*) to be [OFF], and said switch (22) also changes said control valve (15*c*) into [ON]. Thus, both the driving chamber (7*a*) and the cushion chamber (7*b*) are supplied with compressed air, so said piston (10) and said plunger (11) are actuated by differential pneumatic force. Thus, the plunger (11) pressurizes the oil in the hydraulic output chamber (9) and this hydraulic pressure is charged into the actuating chamber (2) of the knockout device (S), passing through said small passage (17*b*) and said charge valve (21*b*) and also passing through the hydraulic passage (23).

The oil flow rate is adjusted by said restrictor (20) so that said knockout piston (3) may advance downward at adequate speed.

The pressurized oil in the actuating chamber (2) drives the piston (3), by which the pad-frame (4) is driven downward by until touching and pushing the printed circuit plate (M). Immediately after the printed circuit plate (M) being cushioned by the pad-frame (4), the slide (1) reaches its bottom dead point, and at the same instant, the upper die (5*a*) punches the work (M).

When the knockout piston (3) is moved upward by its nearly full stroke, said control valve (15*c*) being changed into [OFF], and thus said locking valve (21) is changed into [OFF] position shown in FIG. 1 in order to stop charging of pressurized oil.

As described above, the printed circuit plate (M) is punched while being cushioned by the pad-frame (4) and, during cushioning, the pressurized oil returns to the output return port (16), passing through the hydraulic passage (23) and also said large flow passage (17*a*) and said small flow passage (17*b*) and said check valves (19.21*a*). After the slide (1) has been elevated from its bottom dead point to a given point, charging of hydraulic pressure into the actuating chamber (2) is stopped.

Thus the knockout motion is delayed for a given short period, in order to elevate the work (M) for the given height above the lower die (5*a*), under the condition penetrated by the upper die (5).

When the printed circuit plate (M) is elevated, the chute of an automatic transferring machine (not shown) is instantly disposed under the work (M) and, at the same time, knocking out motion is executed by again charging hydraulic pressure into the actuating chamber (2) by means of changing the locking valve (21) through changing the control valve (15*c*) with the rotary cam switch (22).

During the knocking out motion, the printed circuit plate (M) is pushed off from the upper die (5) onto the chute by the pad-frame (4).

Therefore, the printed circuit plate (M) can be taken out steadily and easily outside the press machine (P).

Just before knocking out motion, if necessary, switching the control valve (15*b*) into [ON] will exhaust the compressed air from the cushion chamber (7*b*). This makes it possible to increase the differential pneumatic pressure between the driving chamber (7*a*) and said cushion chamber (7*b*) and thus increase the hydraulic pressure in the output return port (16).

It is possible to generate much larger knockout force than cushion force. However, if necessary, without changing said locking valve (21) just after punching the work (M) and by holding said charge valve (21*b*) open, it will be possible to knock out the work (M) from the upper die (5) immediately after the slide starts lifting, in a conventional device.

By switching said control valves (15*a*.15*b*.15*c*) and said locking valve (21) with the rotary cam switch (22) according to the motion of the slide (1), the knockout device (S) can be operated to start cushioning motion and knocking out motion with the most accurate timing for the slide (1).

Each of said control valves (15*a*.15*b*.15*c*) is constructed so as to be changed with its solenoid connected electrically with the control circuit to the rotary cam switch (22). This rotary cam switch (22) is provided with at least three switches, and the timing of switching each control valve (15*a*.15*b*.15*c*) is adjusted to each of said switches.

The variable restrictor (20) adjusts the lowering velocity of the knockout piston (3), and said large passage (17*a*) is formed in order to return the oil smoothly into the output return port (16).

Alternatively, said check valve (21*a*) can be replaced with a closed gate without omitting the above characteristics.

Figure 2:
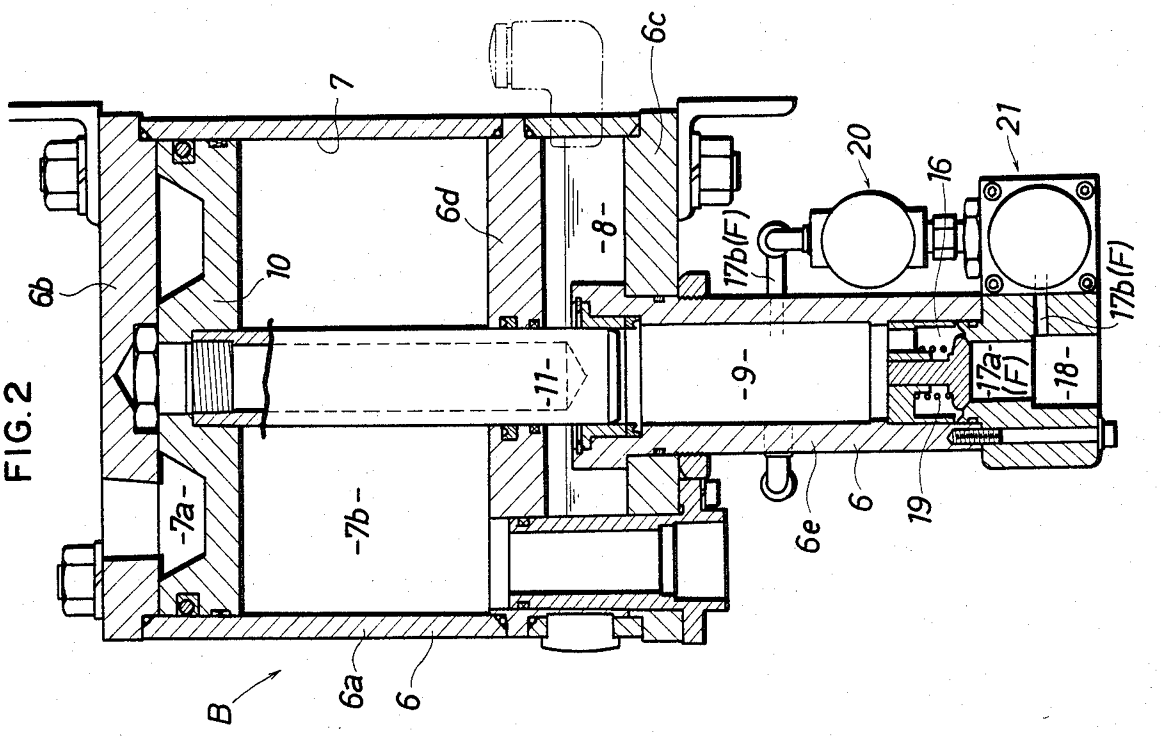
FIG. 2 is an elevational view partially in section of the driving device depicted in FIG. 1.

The following descriptions will relate to the detailed construction of the pneumatic-hydraulic driving device (B) and a check valve (19), according to FIG. 2.

The upper half part of casing (16) comprises a large diametered cylindrical body (6*a*), whose top and bottom are covered by a top plate (6*b*) and a bottom plate (6*c*) respectively. A bulkhead plate (6*d*) is provided inside of the cylindrical body (6*a*), and said pneumatic cylinder chamber (7) is disposed between the top plate (6*b*) and the bulk head plate (6*d*). The oil tank (8) is disposed between the bulkhead plate (6*d*) and the bottom plate (6*c*).

The lower half part of the casing (6) comprises a bottom plate (6*c*) and a small diametered cylindrical body (6*e*), which is received through the bottom plate (6*c*). The hydraulic output chamber (9) is formed inside the cylindrical body (6*e*), in which lower part there are formed a check valve (19), a large flow passage (17*a*) and the outlet port (18). Moreover, the locking valve (21) is fixed on the lowest side of the cylindrical body (6*e*), and the variable restrictor (20) is connected with the locking valve (21) and the small cylindrical body (6*e*).

Figure 3:
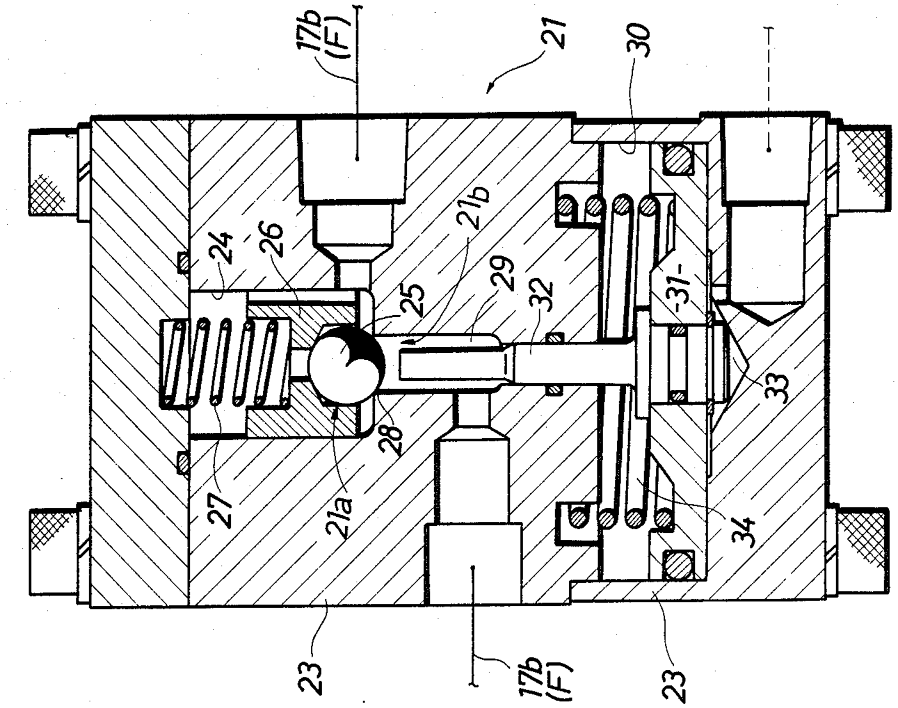
FIG. 3 is an elevational view of a cross-section of a locking valve with a charge valve and a check valve.

The following descriptions will relate to the detailed construction of the locking valve (21), referring to FIG. 3.

In the upper central part of the valve casing (23) in the drawing, a valve chest (24) is disposed cylindrically about said check valve (21*a*). As a mid portion of the small flow passage (17*b*), an axial passage (29) is formed so as to communicate with the bottom of the valve chest (24), and the check valve (21*a*) is constructed so as to shut the valve sheet (28) with a spherical valve body (25) which is pushed elastically with a holder (26) forced by a coil spring (27).

The charge valve (21*b*) comprises a valve push-rod (32) and an air cylinder for actuating the push-rod (32). In the lower part of the valve casing (23) in the drawing, there is provided said air cylinder, whose piston (31) is forced downwardly by a coil spring (34). Above valve push-rod (32) fixed with the piston (34) at its lower end, is arranged so that its upper part is located in the axial passage (29) and its top is facing the valve body (25).

When opening said charge valve (21*b*), the compressed air is supplied into the pneumatic actuating chamber (33), and the piston (34) is actuated upward, thus the valve body (25) is pushed up to open the small flow passage (17*b*) by the valve push-rod (32). Naturally, without supply of pneumatic pressure into the actuating chamber (33), the valve push-rod (32) is off the valve body (25), and thus the check valve (21*a*) works effectively.

Figure 4:
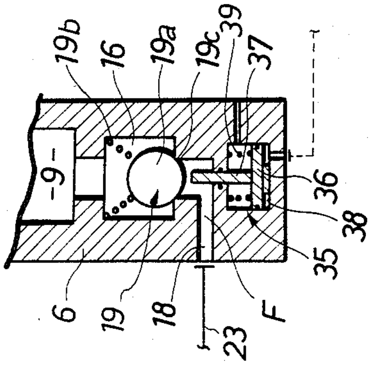
FIG. 4 is a partial elevational view of a cross section of another embodiment of the locking valve depicted in FIG. 3.

The following descriptions relate to the detailed construction of the charge valve according to another embodiment, as shown in FIG. 4.

The said locking valve (21) with independent valve casing (23) can be omitted, and the charge valve (21*b*) is constructed together with check valve (19) in the same casing.

A spherical valve body (19*a*) in the output return port (16) is pushed elastically to touch the valve sheet (19*c*) formed at the inner end of the hydraulic passage (F) by means of a coil spring (19*b*). The charge valve (21*b*) comprises a piston-rod (37) fixed to the piston (36) of the air cylinder (35), and the top of the piston-rod (37) is located in the hydraulic passage (F), facing the valve body (19*a*). When charging hydraulic pressure to said knockout cylinder by driving the plunger (11) with the actuating piston (10), the hydraulic passage (F) is opened by pushing up the valve body (19*a*) with the piston-rod (37) through actuating the piston (36) against the coil spring (39) by the compressed air supplied into the actuating chamber (38). During cushioning motion, the compressed air is not supplied into the actuating chamber (38) and the check valve (19) works effectively. Thus, charging of hydraulic oil into the actuating chamber (2) is stopped, and the hydraulic pressure can release through the check valve (19).

What we claim is:

1. An improved pneumatic-hydraulic driving device for a knockout mechanism associated with the slide of a press-machine having a crank to move an upper die into and out of a corresponding lower die, which device comprises, in combination:

(a) a first casing;

(b) a pneumatic chamber disposed within the casing;

(c) an hydraulic chamber disposed within the casing adjacent to the pneumatic chamber;

(d) a slidable piston disposed in the pneumatic chamber and dividing the chamber into a driving chamber and a cushion chamber;

(e) a slidable plunger disposed in the hydraulic chamber, with the piston and plunger being connected for joint movement;

(f) an output port in the hydraulic chamber;

(g) an outlet port in the casing;

(h) a knockout piston slidably disposed in a knockout cylinder of the knockout mechanism;

(i) an actuating chamber formed above the knockout piston in the knockout mechanism;

(j) an hydraulic fluid passage providing communication between the output port and the actuating chamber through the outlet port;

(k) a charge valve means disposed in the hydraulic fluid passage to control the flow of hydraulic fluid from the output port to the actuating chamber while permitting flow in the opposite direction;

(l) a source of pneumatic pressure;

(m) first control means interconnected with the pneumatic pressure source and the pneumatic chamber to control the pressure differential across the slidable piston between a high value to supply hydraulic fluid to the actuating chamber at a high pressure, and a low value to supply hydraulic fluid to the actuating chamber at a low pressure;

(n) second control means for controlling the position of the charge valve means between its open and closed positions to control the flow of pressurized hydraulic fluid from the output port to the actuating chamber; and, (o) switch means interconnecting the first and second control means with the crank of the press-machine such that low pressure hydraulic fluid is supplied to the actuating chamber as the crank moves from its top dead center to its bottom dead center and, after arriving at a predetermined position after passing its bottom dead center, high pressure hydraulic fluid is supplied to the actuating chamber to activate the knockout mechanism.

2. The device of claim 1, wherein:

(a) the upper half portion of the first casing is substantially of cylindrical configuration, with the interior thereof defining the pneumatic chamber; and (b) the lower half portion of the first casing is substantially of cylindrical configuration and smaller in diameter than the upper half portion, with the interior of the lower half portion defining the hydraulic chamber and output port.

3. The device of claim 1 wherein the first control means comprises: first conduit means connecting the source of pneumatic pressure to the pneumatic chamber such that pressurized air is supplied to the driving chamber; first pressure regulating means disposed in the first conduit to regulate the pressure supplied to the driving chamber; and, first control valve means disposed in the first conduit downstream of the first pressure regulating means, the first control valve means being moved between open and venting positions by the switch means.

4. The device of claim 3 wherein the first control means further comprises: second conduit means connecting the source of pneumatic pressure to the pneumatic chamber such that pressurized air is supplied to the cushion chamber; second pressure regulating means disposed in the second conduit to regulate the pressure supplied to the cushion chamber, the pressure in the cushion chamber being lower than the pressure in the driving chamber; and, second control valve means disposed in the second conduit downstream of the second pressure regulating means, the second control valve means being moved between open and venting positions by the switch means.

5. The device of claim 4 wherein the charge valve means comprises a spring biased check valve disposed in the hydraulic fluid passage such that it normally prevents hydraulic fluid flow from the hydraulic chamber to the actuating chamber; and means to displace the check valve against the spring bias to thereby permit hydraulic fluid to flow from the hydraulic chamber to the actuating chamber.

6. The device of claim 5 wherein the means to displace the check valve comprises a pneumatically actuated piston having a piston rod which bears against the check valve to open the valve when the piston is in a first position, and does not contact the check valve when the piston is in a second position; third conduit means connecting one side of the piston to the source of pneumatic pressure; and third control valve means disposed in the third conduit means operable between open and venting positions by the switch means.

7. The device of claim 4 wherein the hydraulic fluid passage includes a large flow passage, a small flow passage disposed in parallel with the large flow passage, and wherein the charge valve means comprises a ball check valve disposed in the large flow passage to permit the flow of hydraulic fluid through the large flow passage from the actuating chamber to the hydraulic chamber only; and a locking valve disposed in the small flow passage, the locking valve movable from a first position in which it permits hydraulic fluid to flow through the small flow passage from the actuating chamber to the hydraulic chamber only and a second position in which it is open to allow hydraulic fluid to flow in either direction.

8. The device of claim 7 wherein the small flow passage further includes means for variably restricting fluid flow therethrough.

9. The device of claim 7 further including:

(a) a second casing independent of the first casing, with the locking valve and small flow passage being disposed in the second casing; and (b) means providing communication between the first and second casings.

10. The device of claim 7 further comprising: pneumatic actuating means connected to the locking valve to move it between its first and second positions; third conduit means interconnecting the pneumatic source and the pneumatic actuating means; and third control valve means disposed in the third conduit operable between open and venting positions by the switch means.

* * * * *